(12) United States Patent
Hirade et al.

(10) Patent No.: US 7,212,469 B2
(45) Date of Patent: May 1, 2007

(54) MIXING RECORDER, CONTROL METHOD THEREFORE, AND COMPUTER-READABLE MEDIUM INCLUDING PROGRAM FOR IMPLEMENTING THE CONTROL METHOD

(75) Inventors: Seiji Hirade, Shizuoka-ken (JP); Ryohsuke Ohtani, Shizuoka-ken (JP); Yoshiki Kasahara, Shizuoka-ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 665 days.

(21) Appl. No.: 10/702,381

(22) Filed: Nov. 5, 2003

(65) Prior Publication Data

US 2004/0091126 A1 May 13, 2004

(30) Foreign Application Priority Data

Nov. 5, 2002 (JP) .............................. 2002-321656

(51) Int. Cl.
*H04B 1/20* (2006.01)
(52) U.S. Cl. .................. 369/4; 369/2; 84/602
(58) Field of Classification Search .................... 369/4, 369/5, 1, 2; 381/119, 117; 84/602, 603
See application file for complete search history.

(56) References Cited

U.S. PATENT DOCUMENTS 7,119,267 B2 * 10/2006 Hirade et al. .................. 84/602

FOREIGN PATENT DOCUMENTS

| JP | 06-301391 | 10/1994 |
| JP | 2000-338984 | 12/2000 |
| JP | 2001-084179 | 3/2001 |
| JP | 2002-074919 | 3/2002 |
| JP | 2003066979 A | 3/2003 |
| JP | 2003066999 A | 3/2003 |

* cited by examiner

*Primary Examiner*—Ali Neyzari
(74) *Attorney, Agent, or Firm*—Harness, Dickey & Pierce, PLC

(57) ABSTRACT

There is provided a mixing recorder which enables the user to readily produce music using overdubbing and/or other recording techniques while suppressing degradation of sound quality to the minimum and enables the user to easily find out his/her desired mixing result from a large number of mixing results obtained in the process of mixing. An audio signal is input, and a source file is read out from a memory card and an audio signal is reproduced based on the source file. The input audio signal and the reproduced audio signal are mixed into a mixed signal, which is then stored as a new source file in the memory card. The source file stored in advance in the memory card is backed up before the new source file is stored in the memory card, and in the back-up, the source file is automatically backed up by generating a file given a new name associated with a name of a source file to be backed up and having the same contents as the contents of the source file.

7 Claims, 7 Drawing Sheets

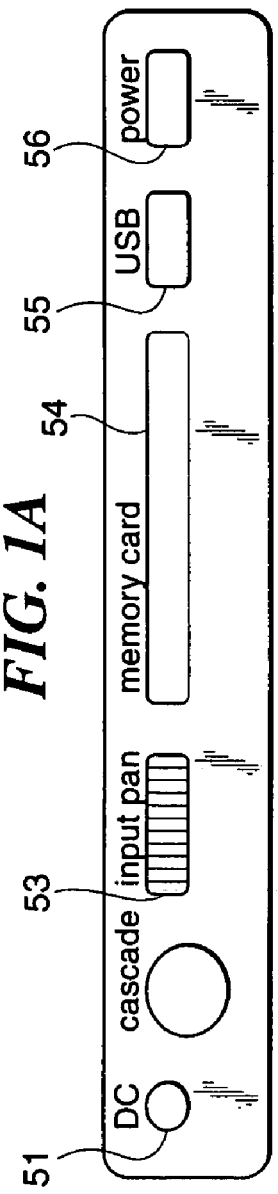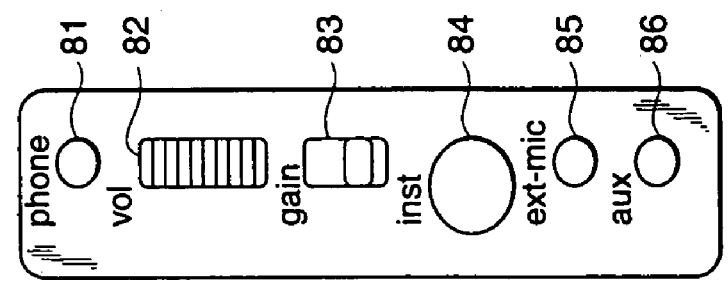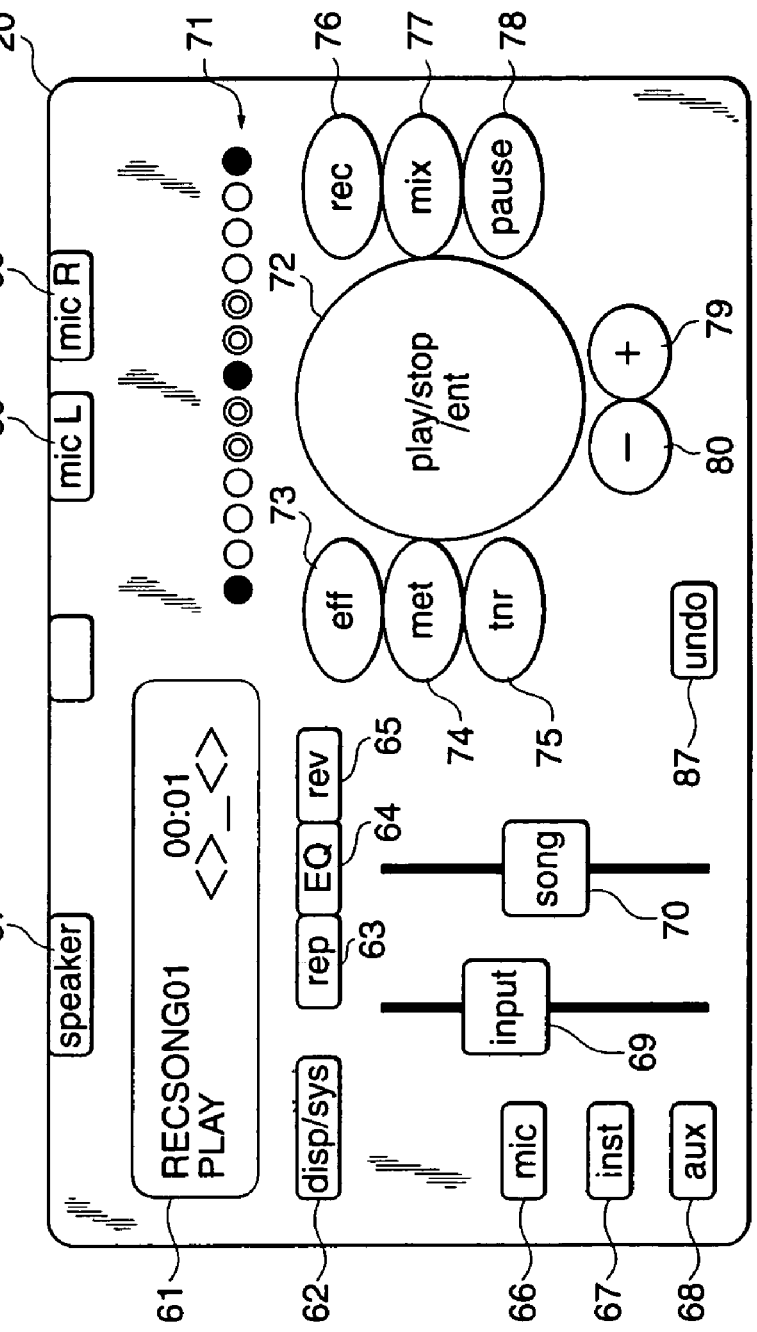

MIXING RECORDER, CONTROL METHOD THEREFORE, AND COMPUTER-READABLE MEDIUM INCLUDING PROGRAM FOR IMPLEMENTING THE CONTROL METHOD

BACKGROUND OF THE INVENTION

1. Field of the Invention

The present invention relates to a mixing recorder and a control method for the same which enable the user to produce music by inputting an audio signal via a microphone or the like while monitoring a recorded audio signal, and mixing the input audio signal and the recorded audio signal, as well as to a program for implementing the control method.

2. Description of the Related Art

In recent years, musical apparatuses with enhanced portability have been realized due to the advance of the audio compression technique and the miniaturization technique of electronic components. For example, in a portable MP3 player which employs the audio compression technique of MP3, a WAV file formed by digitally sampling an audio signal generated by performance of a piece of music and/or singing of a song is encoded in the MP3 format, and the resulting file compressed in the MP3 format is stored in a flash memory or the like, thereby enabling users to enjoy the reproduction of the recorded piece of music and/or song, away from home, e.g. outdoors.

Further, a portable karaoke apparatus disclosed e.g. in Japanese Laid-Open Patent Publication (Kokai) No. 2000-338984 is capable of extending and reproducing an audio signal file encoded and stored in the MP3 format, and at the same time mixing an audio signal of a human voice input via a microphone with the reproduced audio signal for audio reproduction, thereby enabling users to enjoy a desired karaoke performance away from home.

These apparatuses are all intended for reproduction or playback, and do not record or store audio signals input via a microphone or the like. However, these apparatuses include a type which is capable of recording and storing audio signals. For example, a portable MP3 recorder has been proposed which is equipped with an analog input terminal, and is capable of performing A/D (Analog-to-Digital) conversion of an audio signal input via the analog input terminal from a cassette tape recorder, a radio receiver, or the like, and then encoding the resulting digital audio signal in the MP3 format, to store the compressed file as an audio signal file.

However, the portable MP3 recorder of this type is not capable of performing "recording with mixing (overdubbing)" in which a number of input signals are multiplexed. As a musical apparatus capable of recording with mixing, a double radio-cassette player, for example, is known. In the double radio-cassette player, it is possible to reproduce musical tones from one cassette tape, and at the same time mix an audio signal of the reproduced musical tones and an audio signal input via a microphone or an external input terminal, to record the mixed audio signals in the other cassette tape in a multiplexing manner.

In the double radio-cassette player, however, when the mixing is repeatedly carried out, dubbing of analog signals of musical tones is repeatedly carried out, resulting in seriously degraded sound quality of the resulting audio signal file. Therefore, this apparatus is not suitable for music production.

Further, in the double radio-cassette player, when the mixing is carried out a number of times, some mixing results may be obtained in the process of mixing before the last mixing result is obtained. In the double radio-cassette player, however, information on e.g. the condition of mixing (for example, how many times the mixing have been carried out) and the property and contents of a piece of music cannot be added to each of the mixing results obtained in the process of mixing, and hence particularly when the user wishes to reuse mixing results obtained in the process of mixing, he/she cannot easily find out the mixing results from a large number of mixing results.

SUMMARY OF THE INVENTION

It is therefore an object of the present invention to provide a mixing recorder and a control method for the same which enable the user to readily produce music using overdubbing and/or other recording techniques while suppressing degradation of sound quality to the minimum and enables the user to easily find out his/her desired mixing result from a large number of mixing results obtained in the process of mixing.

To attain the above object, in a first aspect of the present invention, there is provided a mixing recorder comprising an input device that receives an audio signal, a storage device that stores a source file, a reproducing device that reads out the source file from the storage device and reproduces an audio signal based on the source file, a recording-with-mixing device that mixes the audio signal received by the input device and the audio signal reproduced by the reproducing device into a mixed signal, and stores the mixed signal as a new source file in the storage device, and a backup device that backs up the source file stored in advance in the storage device before the new source file is stored in the storage device by the recording-with-mixing device, and wherein the backup device automatically backs up the source file by generating a file given a new name associated with a name of the source file to be backed up and having same contents as contents of the source file.

According to this mixing recorder, an audio signal is input, a source file is read out from a storage device, an audio signal is reproduced based on the source file, and the input audio signal and the reproduced audio signal are mixed into a mixed signal, which is then stored as a new source file in the storage device. This enables the user to readily produce music using overdubbing and/or other recording techniques while suppressing degradation of sound quality to the minimum. Further, the source file stored in advance in the memory is backed up before the new source file is stored, and in the back-up, the source file is automatically backed up by generating a file given a new name associated with a name of the source file to be backed up and having the same contents as the contents of the source file. This enables the user to easily find out his/her desired mixing result from a large number of mixing results obtained in the process of mixing.

Preferably, the mixing recorder further comprises an undo instructing device operated by a user; for giving an undo instruction, and an undo device that causes the backed-up source file to return to an original source file generated before backup.

According to this referred embodiment, when a user gives an undo instruction by the undo instructing device, the backed-up source file is returned to an original source file generated before backup. As a result, an immediately preceding state can be restored even if erroneous recording with mixing has been carried out.

To attain the above object, in a second aspect of the present invention, there is provided a mixing recorder comprising an input device that receives an audio signal, a storage device that stores a source file, a reproducing device that reads out the source file from the storage device and reproduces an audio signal based on the source file, a recording-with-mixing device that mixes the audio signal received by the input device and the audio signal reproduced by the reproducing device into a mixed signal, and stores the mixed signal as a mixed file in the storage device, an instructing device that instructs the recording-with-mixing device to generate a new mixed file of a system different from a system of the mixed file stored in advance by the mixing-with-recording device, and a naming device operable when the mixing-with-recording device generates the new mixed file in response to the instruction, for automatically giving the new mixed file a file name indicating that contents of the new mixed file are different in system from contents of the mixed file stored in advance.

According to this mixing recorder, an audio signal is input, a source file is read out from a storage device, an audio signal is reproduced based on the source file, and the input audio signal and the reproduced audio signal are mixed into a mixed signal, which is then stored as a mixed file in the storage device. This enables the user to readily produce music using overdubbing and/or other recording techniques while suppressing degradation of sound quality to the minimum. Further, when a new mixed file is generated in response to an instruction for generating a new mixed file of a system different from a system of the mixed file stored in advance, a file name which indicates that the contents of the new mixed file are different in system from the contents of the mixed file stored in advance, is automatically given to the new mixed file. This enables user to find out his/her desired mixing result from a large number of mixing results obtained in the process of mixing, and makes it possible to widen the range of variations of a piece of music.

To attain the above object, in a third aspect of the present invention, there is provided a method of controlling a mixing recorder, comprising the steps of inputting an audio signal, reading out a source file stored in a storage device and reproducing an audio signal based on the source file, mixing the input an audio signal and the reproduced audio signal into a mixed signal, and storing the mixed signal as a new source file in the storage device, and backing up the source file stored in advance in the storage device before the new source file is stored in the storage device, and wherein in the step of backing up the source file, the source file is automatically backed up by generating a file given a new name associated with a name of the source file to be backed up and having same contents as contents of the source file.

According to this control method, the same effects as those obtained by the mixing recorder according to the first aspect can be obtained.

To attain the above object, in a fourth aspect of the present invention, there is provided a method of controlling a mixing recorder, comprising the steps of inputting an audio signal, reading out a source file stored in a storage device and reproducing an audio signal based on the source file, mixing the input audio signal and the reproduced audio signal into a mixed signal, and storing the mixed signal as a mixed file in the storage device, giving an instruction for generating a new mixed file of a system different from a system of the mixed file stored in advance, and automatically giving a file name, indicating that contents of the new mixed file are different in system from contents of the mixed file stored in advance, to the new mixed file when the new mixed file is generated in response to the instruction.

According to this control method, the same effects as those obtained by the mixing recorder according to the second aspect can be obtained.

To attain the above object, in a fifth aspect of the present invention, there is provided a program for causing a computer to execute the method of controlling a mixing recorder according to the third aspect.

According to this program, the same effects as those obtained by the mixing recorder according to the first aspect can be obtained.

To attain the above object, in a sixth aspect of the present invention, there is provided a program for causing a compare to execute the method of controlling a mixing recorder according to the fourth aspect.

According to this program, the same effects as those obtained by the mixing recorder according to the second aspect can be obtained.

The above and other objects, features, and advantages of the invention will become more apparent from the following detailed description taken in conjunction with the accompanying drawings.

BRIEF DESCRIPTION OF THE DRAWINGS

FIGS. 1A to 1C are views showing the appearance of a mixing recorder according to an embodiment of the present invention, in which:

FIG. 1A is a plan view of the mixing recorder;

FIG. 1B is a front view of the mixing recorder; and

FIG. 1C is a right side view of the mixing recorder;

FIGS. 5A and 5B are views showing how a file is generated by recording using the mixing recorder and the generated file, in which:

FIG. 5A shows how a file is generated by recording; and

FIG. 5B shows the generated file; and

DETAILED DESCRIPTION OF THE PREFERRED EMBODIMENTS

Figure 2A:
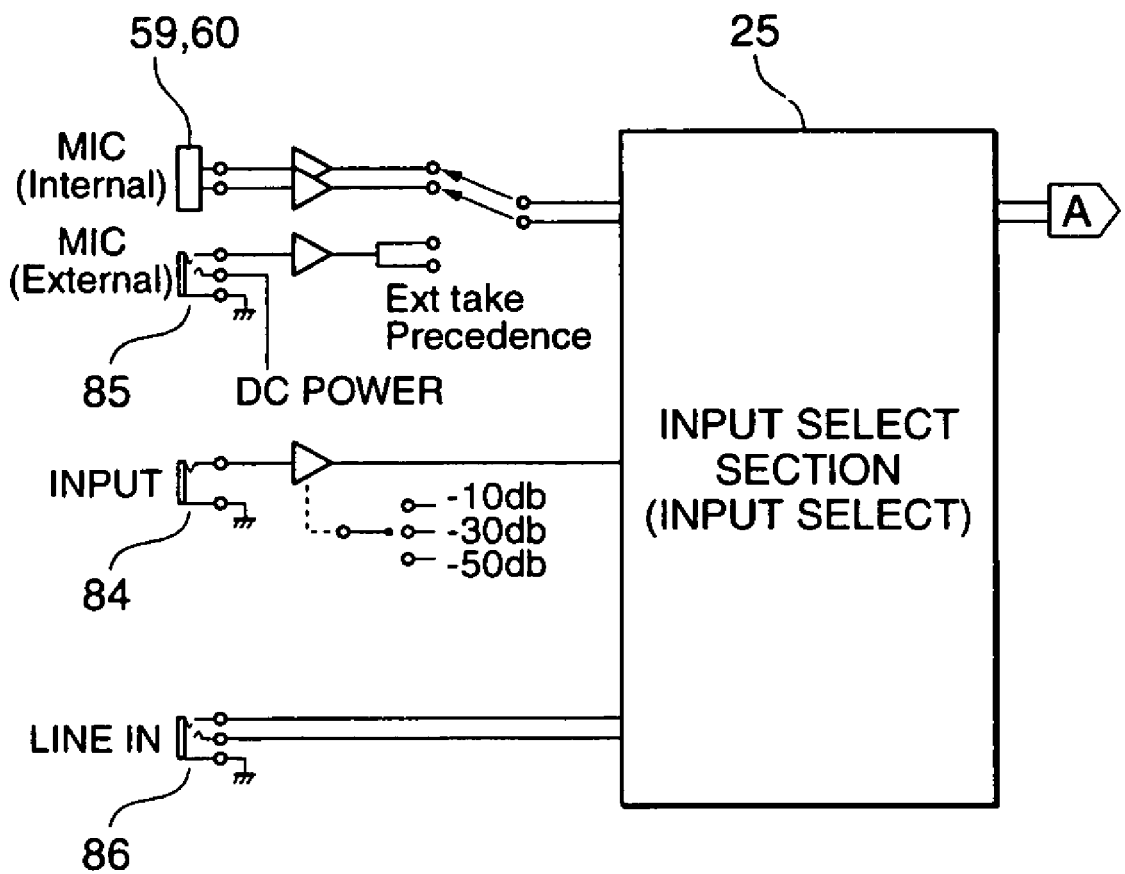
FIGS. 2A and 2B are block diagram showing the arrangement of functional blocks of the mixing recorder.

The present invention will now be described in detail with reference to the drawings showing a preferred embodiment thereof.

Referring first to FIGS. 1A to 1C, there is shown the appearance of a mixing recorder according to an embodiment of the present invention. FIG. 1A is a plan view of the mixing recorder, FIG. 1B is a front view of the same, and FIG. 1C is a right side view of the same. The mixing recorder 20 according to the present embodiment is a musical apparatus intended for producing music by receiving an audio signal input via a microphone or the like while monitoring a recorded audio signal, and carrying out digital mixing of these audio signals. The mixing recorder 20 is particularly configured to be a portable musical apparatus easy to handle even away from home.

As shown in FIG. 1A, DC power is supplied via a terminal (DC) 51. A localizer (input pan) 53 is used for localizing input sound. A memory card 10, described later, is inserted into a slot 54. A USB (Universal Serial Bus) terminal 55 is for USB connection with a personal computer, not shown. When a power switch (power) 56 is depressed or released, the power of the mixing recorder 20 is turned on or off.

As shown in FIG. 1B, the mixing recorder 20 incorporates a small-sized internal speaker (speaker) 57 for auxiliarily outputting an audio signal or generating various operation sounds. Internal microphones (mic L, mic R) 59, 60 are used for inputting external audio sounds including a human voice, in stereo, as analog signals.

A display 61 is formed by a liquid crystal display. On the display 61 are displayed various information items, such as the name of a piece of music, the time of day, a playing time, a mode, and configuration (settings) information. A display/system switch (disp/sys) 62 is used for switching the display mode of the display 61, as well as for switching between system configuration screens for copying or deleting a piece of music, changing the name of a piece of music, and so forth. A repeat switch (rep) 63 is used for executing repetitive reproduction of musical tones. An EQ switch 64 and a reverberation switch (rev) 65 are used for selection of an output ambient condition, e.g. for equalization of an output voice and application of reverberation to the same.

A microphone switch (mic) 66, an instrument switch (inst) 67, and an auxiliary switch (aux) 68 are each used for selection of an input audio signal path, i.e. for input selection. A selected one of the switches lights up. On the other hand, as shown in FIG. 1C, the mixing recorder 20 has a side face thereof provided with an instrument terminal (inst) 84, an external microphone terminal (ext-mic) 85 for connection with an external microphone of an accessory pin type, and an auxiliary terminal (aux) 86. When the microphone switch 66 is selected, normally, signals from the internal microphones 59, 60 can be input, but when an external microphone is connected to the external microphone terminal (ext-mic) 85, a signal from the external microphone is input in preference to the signals from the internal microphones 59, 60. When the internal microphones 59 and 60 are selected, the internal speaker 57 is automatically turned off. When the instrument switch 67 is selected, it is possible to input a signal from an electronic musical instrument, such as an electric guitar or an electric keyboard, connected to the instrument terminal 84. Further, when the auxiliary switch 68 is selected, it is possible to input a signal from an audio apparatus or the like connected to the auxiliary terminal 86 by line-input.

An input level (input) adjuster 69 is used for adjusting the input level of an audio signal externally input, while an output level (song) adjuster 70 is used for adjusting the reproduction level of an audio signal reproduced from a source file 11 stored in the memory card 10, described later.

An LED level meter 71 is comprised of a plurality of LED's, each of which lights up or blinks to indicate an input level, a reproduction level, a recording level, and so forth. A reproduction/recording (play/stop/ent) button 72 is not only used for starting and stopping reproduction and recording, but also used as a determination key for determining various configurations. An effect button (eff) 73 is used for applying effects, such as delay, to input audio signals. A metronome button (met) 74 is used for setting and turning on/off of a metronome function. A tuner button (tnr) 75 is used for utilizing a tuner function and a tone generator function. In an input mode, the LED level meter 71 blinks according to the pitch of an input audio signal, whereas in a tone mode, a reference tone of a preset musical interval is sounded.

A recording button (rec) 76 is used for digital recording of an input audio signal. When the recording button 76 is depressed, the mixing recorder 20 is brought into a recording standby state, and then when the reproduction/recording button 72 is depressed, the recording is started. A mixing button (mix) 77 is used for carrying out digital recording with mixing of an input audio signal and an audio signal reproduced from the source file 11. When the mixing button 77 is depressed, the mixing recorder 20 is brought into a recording-with-mixing standby state, and then when the reproduction/recording button 72 is depressed, the recording with mixing is started. A pause button (pause) 78 is used for temporarily stopping the reproduction. It should be noted that each of the buttons 73 to 76 incorporates an LED, not shown, which lights up when the button is depressed.

A plus button (+) 79 and a minus button (−) 80 are used for selection of a piece of music (hereinafter referred to as "a song") in the source file 11. The name of a song selected by the plus or minus button 79 (80) is shown on the display 61. When the name of a desired song is displayed, the reproduction/recording button 72 is depressed, whereby the selection of the song is determined. It should be noted that when the user has not named a song, a name (serial number or the like) is automatically added to the song when the song is recorded in the source file 11. An undo button (undo) 87 is used for canceling immediately preceding memory access processing and restoring an original state.

Referring to FIG. 1C, a phone terminal (phone) 81 is connectable to a head phone or the like, via which input sound, a song, or a mixed audio sound which is being reproduced can be listened to. A volume controller (vol) 82 is used for setting an audio output level. A gain controller (gain) 83 is used for gain adjustment of an audio signal input via the instrument terminal 84.

Figure 2B:
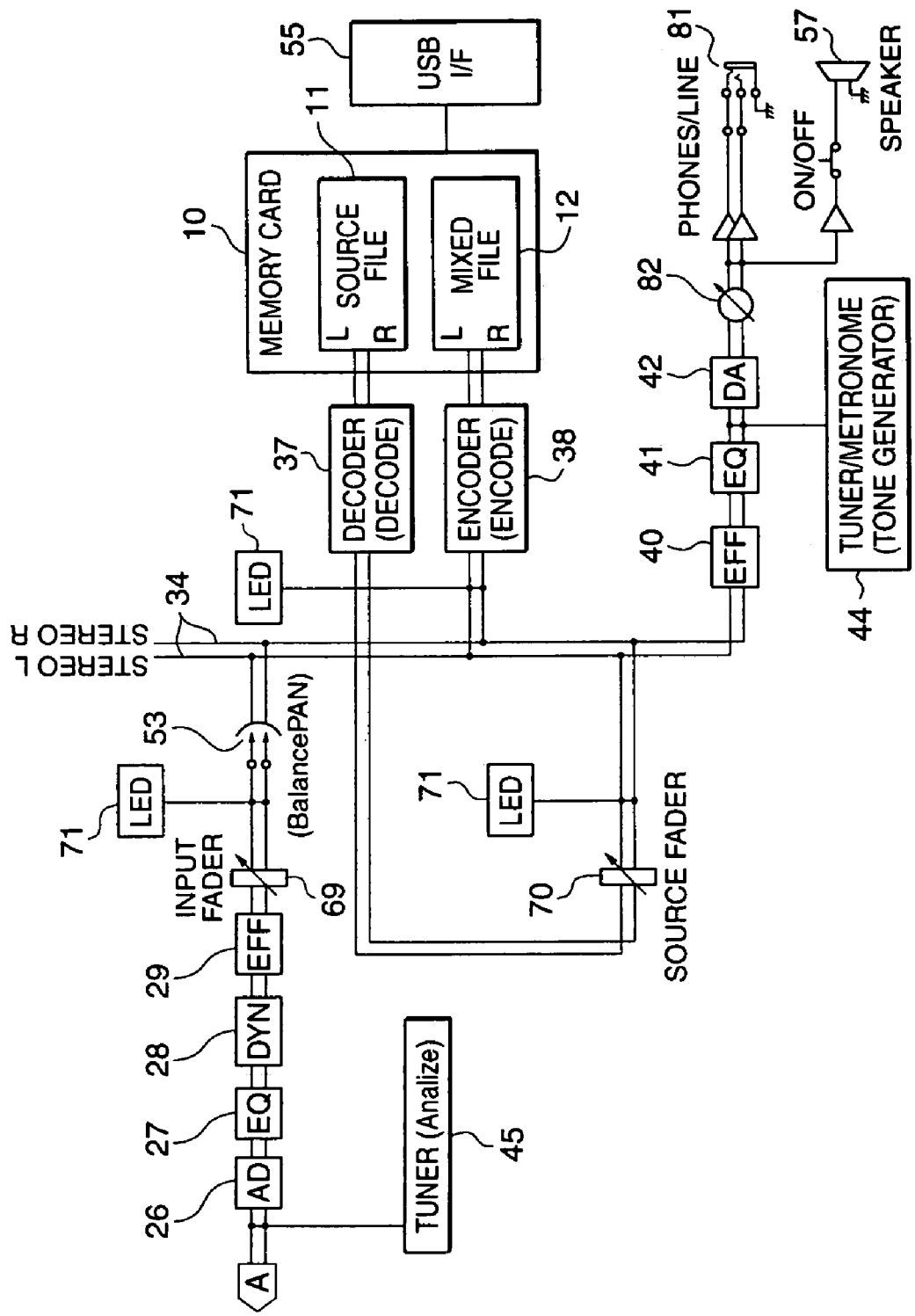

FIGS. 2A and 2B are block diagram showing the arrangement of functional blocks of the mixing recorder according to the present embodiment. In FIG. 2B, the memory card 10, which is a portable and removable storage medium, is seen to be inserted into the slot 54.

An input select section (input select) 25 selects an analog audio signal to be input or received, from signals from the pair of internal microphones 59, 60, the instrument terminal 84, the external microphone terminal 85 and the auxiliary terminal 86. The analog audio signal output from the input select section 25 is converted to a digital audio signal by an A/D converter 26. Then, the digital audio signal is equalized by an EQ (equalizer) 27, subjected to a consonant suppressing process by a dynamic effector (DYN) 28, and has applied thereto effects, such as reverberation, delay, and flanger, by an effector (EFF) 29.

The signal output from the effector 29 is subjected to input level adjustment by the input level adjuster 69 and localization by the localizer 53, and then input to an output line 34.

The USB I/F 55 is connected to the memory card 10.

Figure 3:
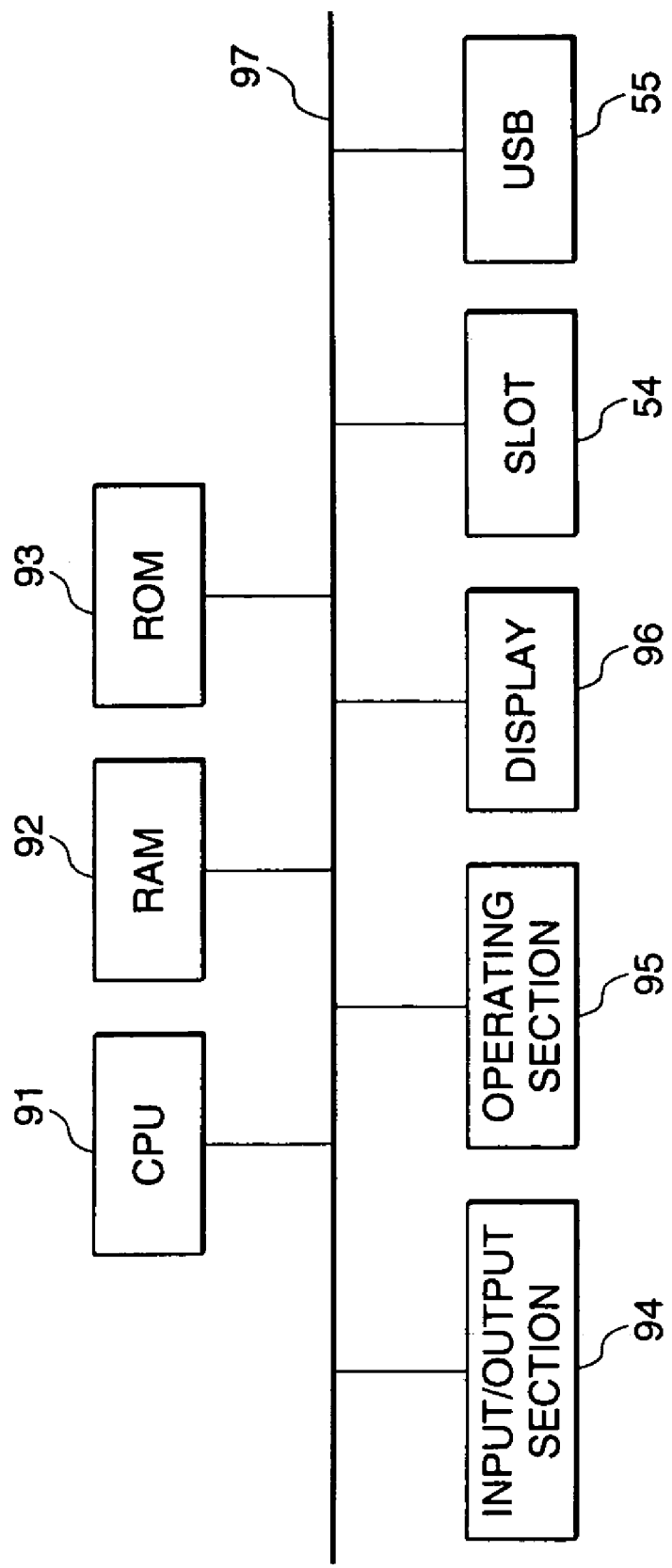
FIG. 3 is a block diagram showing the internal construction of the mixing recorder.

FIG. 3 is a block diagram showing the internal construction of the mixing recorder according to the present embodiment.

In the mixing recorder 20, the slot 54 and the USB terminal 55 are connected to a CPU 91 via a bus 97. Further, a RAM 92, a ROM 93, an input/output section 94, an operating section 95, and a display section 96 are connected to the CPU 91 via the bus 97.

The CPU 91 controls the overall operation of the mixing recorder 20. The RAM 92 temporarily stores various kinds of data, and also functions as a work area for the CPU 91. The ROM 93 stores not only various control programs to be executed by the CPU 91, but also various kinds of data.

The input/output section 94 is comprised of a group of elements involved in the input to and output from the mixing recorder 20, including the internal microphones 59, 60, the terminals 84 to 86, the internal speaker 57, and the phone terminal 81. The operating section 95 is comprised of a group of elements involved in the input to and operation of the mixing recorder 20, including the switches 62 to 68, the adjusters 69, 70 and the buttons 72 to 80. The display section 96 is comprised of a group of elements involved in display, including the display 61 and the LED level meter 71.

Referring again to FIG. 2B the memory card 10 can store the source file 11 and a mixed file 12. These files each store data of an audio signal compressed in the MP3 (MPEG-1 Audio Layer-III) format.

The source file 11 is an original file to be mixed with an audio signal input e.g. from the internal microphones 59, 60 via the input select section 25. The source file 11 is initially stored as a mixed file 12 by recording an input audio signal without executing a mixing process (this kind of recording will be hereinafter referred to as "simple recording") (in this case, since no mixing process is carried out, the name of the mixed file does not represent the contents of the file faithfully). It should be noted that there can be a plurality of source files 11. Further, the source file 11 may be obtained by mounting the memory card 11 into another apparatus and storing existing data therein in advance.

The mixed file 12 is obtained by mixing an audio signal from the source file 11 and an audio signal input via the input select section 25 and storing the resulting mixed signal (this kind of recording will hereinafter be referred to as "recording with mixing"). The mixed file 12 can be used as a new source file 11 in place of the original source file 11 on the next and subsequent occasions.

In recording with mixing, an audio signal from the source file 11 is extended into a digital audio signal by a decoder (DECODE) 37. The digital audio signal is subjected to output level adjustment by the output level adjuster 70, and then input to the output line 34.

The digital audio signal input to the encoder 38 via the output line 34 is compressed in the MP3 format by the encoder 38, and then stored as a mixed file 12 in the memory card 10

When the mixed file 12 is stored by recording with mixing, the original source file 11 is renamed as a backup file, and the mixed file 12 is stored after being renamed so that it has the same name as that of the original source file 11. Accordingly, the process of storing the mixed file 12 appears to be similar to a process of overwriting the source file 11 by a new source file 11. Therefore, it is easy to retry the recording with mixing.

The digital audio signal input to an effector (EFF) 40 from the output line 34 has effects applied thereto by the effector 40, and is equalized by an equalizer (EQ) 41, and converted to an analog audio signal by a D/A converter 42. Then, the analog audio signal is subjected to volume setting by the volume controller 82, followed by being output to the phone terminal 81, and also to the internal speaker 57 depending on the case.

As described above, the mixing recorder 20 according to the present embodiment is capable of performing digital recording of an input audio signal and real-time reproduction of the same, digital recording with mixing of an input audio signal and an audio signal (of a song) reproduced from the source file 11 and real-time reproduction of the mixed sound, reproduction of the audio signal from the source file 11, and so forth.

The mixing recorder 20 according to the present embodiment is further provided with a tuner 45 and a tuner/metronome 44. In the above-mentioned input mode, the tuner 45 detects the pitch of an analog audio signal output from the input select section 25, and causes the LED level meter 71 to indicate the detected pitch. In the above-mentioned tone mode, the reference tone of the preset musical interval is output from the tuner/metronome 44 to the D/A converter 42. When the metronome function is selected or turned on, a metronome sound is output from the tuner/metronome 44 to the D/A converter 42. The reference tone or the metronome sound is sounded via the phone terminal 81 or the internal speaker 57.

The LED level meter 71 indicates the input level of input sound, based on a signal having passed through the input level adjuster 69, and also indicates the output level of a song, based on a signal from the source file 11 having passed through the output level adjuster 70. Further, the LED level meter 71 indicates the input level of a signal input to the encoder 38 via the output line 34. The levels of the respective signals may be displayed on the display 61 instead of being indicated by the LED level meter 71.

It should be noted that when the mixing recorder 20 is connected to a personal computer, not shown, via the USB terminal 55, it is possible to gain access to the files within the memory card 10 from the personal computer similarly to the case where an external drive is used by the personal computer, so that the files can be copied, deleted, or moved through the operation of the personal computer, and if a software program is provided, even editing or processing of the files can be performed through the operation of the personal computer.

A description will now be given of a control process carried out by the mixing recorder 20 according to the present embodiment constructed as above with reference to FIGS. 4 and 5A to 5B.

Figure 4:
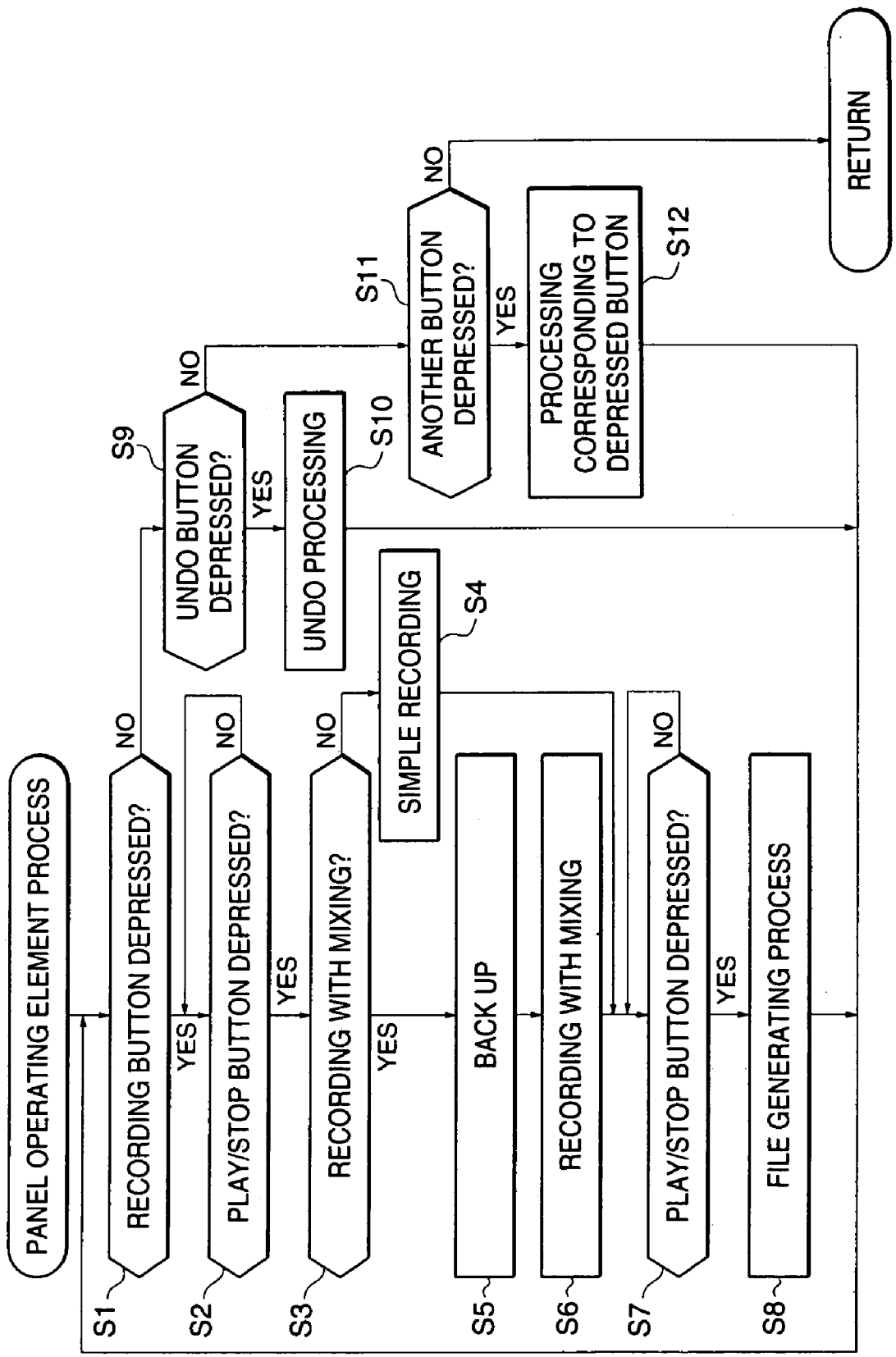
FIG. 4 is a flow chart showing the procedure of carrying out a panel operating element process which is executed by the mixing recorder and more particularly by a CPU.

FIG. 4 is a flow chart showing the procedure of carrying out a panel operating element process which is executed by the present mixing recorder 20 and more particularly by the CPU 91. This process is one of various kinds of processes constituting a main routine.

As described above, when the user depresses the recording button 76, the mixing recorder 20 enters a standby state for recording, and then, when the reproduction/recording (play/stop) button 72 is depressed, the mixing recorder 20 starts recording. On this occasion, however, in the case where recording with mixing is not carried out, i.e. in the first (original) recording, simple recording is executed (step S1→S2→S3→S4) and is continuously performed until the reproduction/recording button 72 is depressed again (step S7). Then, when the simple recording is terminated upon depression of the reproduction/recording button 72, a file generating process is executed (step S8).

Figure 5A:
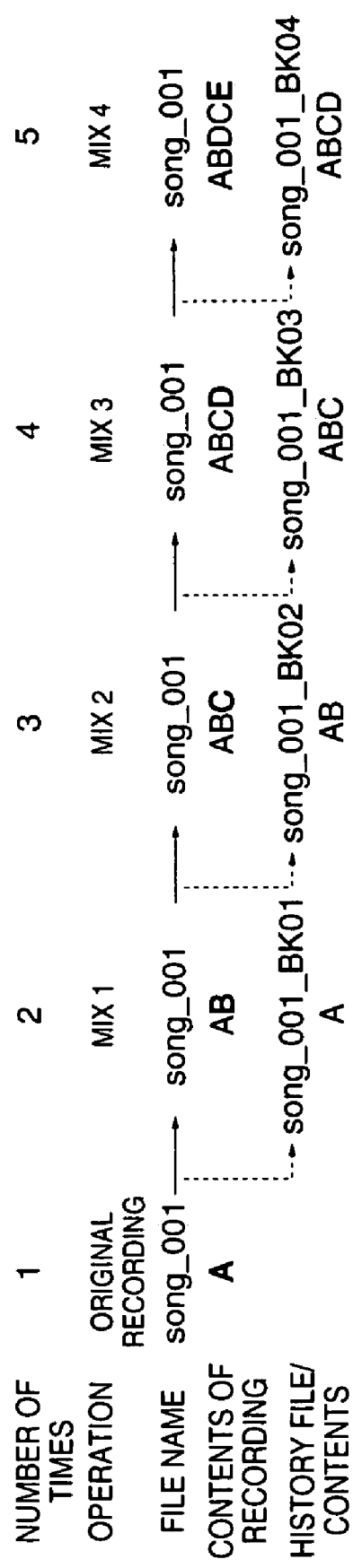
Figure 5B:

FIGS. 5A and 5B are views showing how a file is generated by recording, and the generated file, in which FIG. 5A shows how a file is generated by recording, and FIG. 5B shows the generated file. Processing from the simple recording to the file generating process corresponds to the first recording, i.e. the original recording, having contents "A", as shown in FIG. 5A. Then, a file name "song_001" is automatically given. It should be noted that a file name is not limited to "song_001", but any file names may be given. The present invention, however, relates to the mixing recorder which should be designed to be compact so that it can be easily carried by hand, and hence the size of the display 61 is limited. Thus, the length of the file name should be determined in dependence on the size of the display 61. It should be noted that "A" is only an example, and it may be determined that a sound sounded as "A" by the user has been recorded, or "A" may be regarded as a "piano performance" played by the user has been recorded. This also applies to "B", "C", "D", and "E", described later.

Referring again to FIG. 4, at the start of recording, in the case where recording with mixing is carried out, the present source file 11 is backed up (step S3→S5), and then recording with mixing is carried out, i.e. an audio signal from the source file 11 and an audio signal input via the input select section 25 are mixed to generate the above-mentioned mixed file 12 (step S6). Then, similarly to the above described simple recording, the recording with mixing is continued until the reproduction/recording button 72 is depressed again (step S7). When the recording with mixing is terminated upon depression of the reproduction/recording button 72, the file generating process is executed (step S8).

In FIG. 5A, processing from "MIX 1" to "MIX 4" corresponds to the recording with mixing. For example, in "MIX 1", a file with a name "song_001" is backed up as a file with a name "song_001_BK01", and "A" as the contents of the file "song_001" is mixed with "B" to generate a new file with a name "song_001". Also, in "MIX 3", a file with a name "song_001" is backed up as a file with a name "song_001_BK03", and "ABC" as the contents of the file "song_001" is mixed with "D" to generate a new file "song_001". It should be noted bold letters in FIG. 5A indicate those which are newly added by recording with mixing.

When the recording with mixing proceeds to "MIX 4" in the above described manner, the latest (last) mixing result is obtained as a file "song_001", and a history of mixing results obtained by recording with mixing before the latest mixing result is obtained (i.e. mixing results obtained in the process of mixing) is backed up in files "song_001_BK01" to "song_001_BK4". The present invention is characterized by giving a file name which enables the user to know which file is backed up as a backup file when generating the backup file. Specifically, in the illustrated example, "_BKnm" (n and m are integers from 0 to 9) is added to a name "song_001" of a file as the latest mixing result so that the user can readily recognize that a backup file is a backup of a file "song_001" as well as the order of backup files. Of course, it goes without saying that the way of naming is not limited to this insofar as a file name enables the user to know that a file is a backup file as well as the order of backup files.

Referring again to FIG. 4, when the undo button 87 is depressed, undo processing is executed (step S1→S9→S10). In the undo processing, an immediately preceding memory access process is canceled to restore an original state as mentioned above, and more specifically, for example, when the undo button 87 is depressed in the state of "MIX 2" appearing in FIG. 5A, the mixing recorder returns to the state of "MIX 1". Namely, the file "song_001_BK02" returns to the file "song_001".

By executing the above described undo processing, an immediately preceding state can be restored even if erroneous recording with mixing has been carried out. Namely, it is possible to eliminate the necessity of deleting a new file generated by erroneous recording with mixing.

Referring again to FIG. 4, when another button is depressed, processing corresponding to the depressed button is executed (step S1→S9→S11→S12). On the other hand, if no button is depressed, the panel operating element process is terminated without doing anything, and then another process of the main routine is executed.

In this way, according to the present embodiment, a history of recording-with-mixing results is managed in chronological order (in a manner being represented by file names), and hence the user can recall the contents of files only by referring to names thereof, and can quickly find out his/her desired file.

Figure 6:
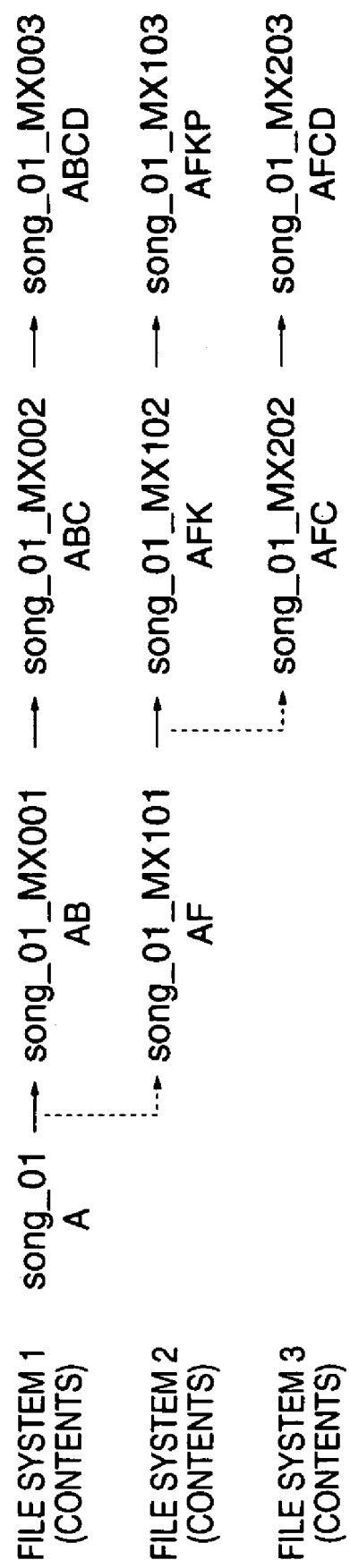
FIG. 6 is a view showing how a file is generated by another file management method.

FIG. 6 is a view showing how a file is generated by another file management method. This method is particularly advantageous in the case where it is desired that a piece of music has a widened range of variations while music is produced by recording with mixing.

As shown in FIG. 6, first, similarly to the original recording described above with reference to FIG. 5A, a file with a name "song_001" and "A" as the contents of the file is recorded. Then, recording with mixing is carried out based on this file (source file) to generate a new mixed file (with a name "song_01_MX001" and contents "AB"). Then, recording with mixing is continuously carried out based on this mixed file. In this way, recording with mixing is carried out based on the latest mixed file, and as a result, a file system 1 is generated. This file system 1 is similar to a file system appearing in FIG. 5B although the file system 1 differs in file names from the file system appearing in FIG. 5B. On the other hand, a file system 2 is generated by carrying out recording with mixing-based on the file "song_01" in a way ("F" is input in the illustrated example) different from the way of generating the file system 1, with the files of the file system 1 being maintained. In this case, files of the file system 2 have names such as "song_01_MX101" different from those of the files of the file system 1 so as to indicate that the files of the file system 2 are different from those of the file system 1. It is possible to express a large number of file systems by changing "_MXnmk" (nmk is a three-digit integer; n, m, and k are integers from 0 to 9) added to "song_01". Typically, an instruction for selecting a file system is given by the user depressing a specific switch (or a switch provided in advance in the present mixing recorder 20), but alternatively, a file system may be automatically selected each time recording with mixing is carried out based on the file "song_01", for example. Of course, a file name is automatically given irrespective of whether file systems are selected manually or automatically.

According to the above described file management method, when producing a piece of music, for example, recording with mixing is carried out by mixing an audio signal from the performance of a keyboard and audio signals based on a drum pattern and a base line as basic materials to complete a file system 1, then a variation of the piece of music is created by changing the tone color of the audio signal from the performance of the keyboard and/or changing the arrangement of the piece of music, to generate a file system 2, and specific file names are given to files of the file system 2 for management of the files of this file system. Thus, a piece of music can have a widened range of variations.

Although in the above described embodiment, a file name is automatically given to each file, the automatically given file name may be changed later. In this case, when recording with mixing is carried out based on a file with the changed new file name, "_BKnm" or "_MKnmk" mentioned above is added to the file name. Also, in the original recording, the user may be requested to input the file name.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code read from the storage medium achieves the novel functions of the present invention, and hence the storage medium storing the program code constitutes the present invention.

Examples of the storage medium used for supplying the program code include a flexible disk, a hard disk, an optical disk, a magneto-optical disk, a CD-ROM, a CD-R, a CD-RW, a DVD-ROM, a DVD-RAM, a DVD-RW, a DVD±RW, a magnetic tape, a nonvolatile memory card, and a ROM. Alternatively, the program code may be downloaded from a server computer via a MIDI apparatus or a communication network.

Further, it is to be understood that the functions of the above described embodiment may be accomplished not only by executing the program code read out by a computer, but also by causing an OS or the like operating on the computer to perform a part of or all of actual operations according to the instructions of the program code.

Further, it is to be understood that the functions of the above described embodiment may be accomplished by writing the program code read out from the storage medium into a memory provided in an expansion board inserted into a computer or in an expansion unit connected to the computer and then causing a CPU or the like provided in the expansion board or the expansion unit to perform a part or all of the actual operations based on instructions of the program code.

What is claimed is:

1. A mixing recorder comprising:
an input device that receives an audio signal;
a storage device that stores a source file;
a reproducing device that reads out the source file from said storage device and reproduces an audio signal based on the source file;
a recording-with-mixing device that mixes the audio signal received by said input device and the audio signal reproduced by said reproducing device into a mixed signal, and stores the mixed signal as a new source file in said storage device; and
a backup device that backs up the source file stored in advance in said storage device before the new source file is stored in said storage device by said recording-with-mixing device; and
wherein said backup device automatically backs up the source file by generating a file given a new name associated with a name of the source file to be backed up and having same contents as contents of the source file.

2. A mixing recorder according to claim 1, further comprising:
an undo instructing device operated by a user, for giving an undo instruction; and
an undo device that causes the backed-up source file to return to an original source file generated before backup.

3. A mixing recorder comprising:
an input device that receives an audio signal;
a storage device that stores a source file;
a reproducing device that reads out the source file from said storage device and reproduces an audio signal based on the source file;
a recording-with-mixing device that mixes the audio signal received by said input device and the audio signal reproduced by said reproducing device into a mixed signal, and stores the mixed signal as a mixed file in said storage device;
an instructing device that instructs said recording-with-mixing device to generate a new mixed file of a system different from a system of the mixed file stored in advance by said mixing-with-recording device; and
a naming device operable when said mixing-with-recording device generates the new mixed file in response to the instruction, for automatically giving the new mixed file a file name indicating that contents of the new mixed file are different in system from contents of the mixed file stored in advance.

4. A method of controlling a mixing recorder, comprising the steps of:
inputting an audio signal;
reading out a source file stored in a storage device and reproducing an audio signal based on the source file;
mixing the input an audio signal and the reproduced audio signal into a mixed signal, and storing the mixed signal as a new source file in the storage device; and
backing up the source file stored in advance in the storage device before the new source file is stored in said storage device; and
wherein in said step of backing up the source file, the source file is automatically backed up by generating a file given a new name associated with a name of the source file to be backed up and having same contents as contents of the source file.

5. A method of controlling a mixing recorder, comprising the steps of:
inputting an audio signal;
reading out a source file stored in a storage device and reproducing an audio signal based on the source file;
mixing the input audio signal and the reproduced audio signal into a mixed signal, and storing the mixed signal as a mixed file in the storage device;
giving an instruction for generating a new mixed file of a system different from a system of the mixed file stored in advance; and
automatically giving a file name, indicating that contents of the new mixed file are different in system from contents of the mixed file stored in advance, to the new mixed file when the new mixed file is generated in response to the instruction.

6. A computer-readable storage medium including a program for causing a computer to execute a method of controlling a mixing recorder, the method comprising the steps of:
inputting an audio signal;
reading out a source file stored in a storage device and reproducing an audio signal based on the source file;
mixing the input an audio signal and the reproduced audio signal into a mixed signal, and storing the mixed signal as a new source file in the storage device; and
backing up the source file stored in advance in the storage device before the new source file is stored in said storage device; and
wherein in said step of backing up the source file, the source file is automatically backed up by generating a file given a new name associated with a name of the source file to be backed up and having same contents as contents of the source file.

7. A computer-readable storage medium including a program for causing a computer to execute a method of controlling a mixing recorder, the method comprising the steps of:
inputting an audio signal;
reading out a source file stored in a storage device and reproducing an audio signal based on the source file;

mixing the input audio signal and the reproduced audio signal into a mixed signal, and storing the mixed signal as a mixed file in the storage device;

giving an instruction for generating a new mixed file of a system different from a system of the mixed file stored in advance; and automatically giving a file name, indicating that contents of the new mixed file are different in system from contents of the mixed file stored in advance, to the new mixed file when the new mixed file is generated in response to the instruction.

* * * * *